United States Patent [19]

Cain et al.

[11] 4,268,096
[45] May 19, 1981

[54] FLANGE MOUNT FOR SPHERICAL BEARING

[75] Inventors: Earl S. Cain, Portola Valley; Jerome A. Carlson, Woodside; George E. Goodrich, San Carlos, all of Calif.

[73] Assignee: Tribotech, Redwood City, Calif.

[21] Appl. No.: 897,757

[22] Filed: Apr. 17, 1978

Related U.S. Application Data

[63] Continuation of Ser. No. 743,923, Nov. 22, 1976, abandoned, which is a continuation-in-part of Ser. No. 664,164, Mar. 5, 1976, Pat. No. 4,033,641.

[51] Int. Cl.² ............................................. F16C 35/12
[52] U.S. Cl. ...................................... 308/15; 308/72; 308/194
[58] Field of Search ............... 308/15, 72, 194, 189 A, 308/106, 29

[56] References Cited

U.S. PATENT DOCUMENTS

| 2,794,691 | 6/1957 | Noe | 308/72 |
| 3,477,772 | 11/1969 | Anderson et al. | 308/194 X |

FOREIGN PATENT DOCUMENTS 1243946  8/1971  United Kingdom .................. 308/72

Primary Examiner—Douglas C. Butler
Attorney, Agent, or Firm—Flehr, Hohbach, Test, Albritton & Herbert

[57] ABSTRACT

A mount for a spherical bearing in which the bearing is supported from a flange plate by an integral bearing receiving flange which has a spherical bearing receiving surface to support the bearing and allow it to align with an associated shaft.

6 Claims, 12 Drawing Figures

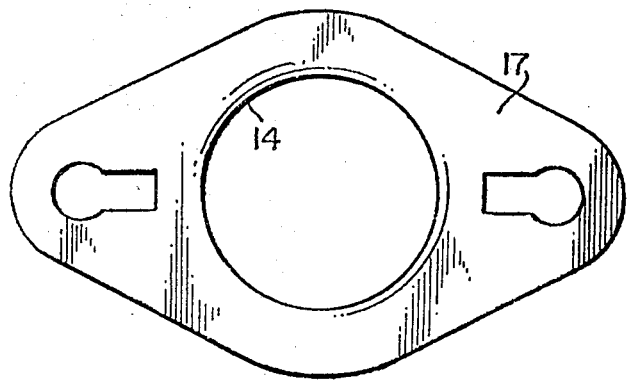
FIG_1
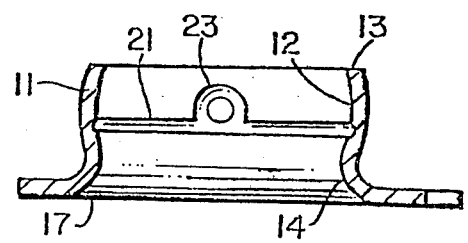
FIG_4
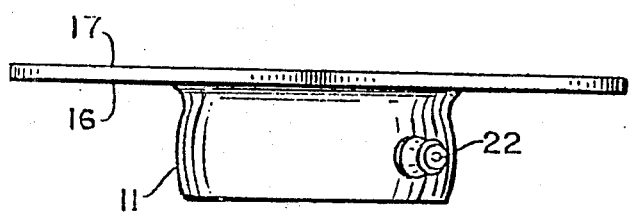
FIG_2
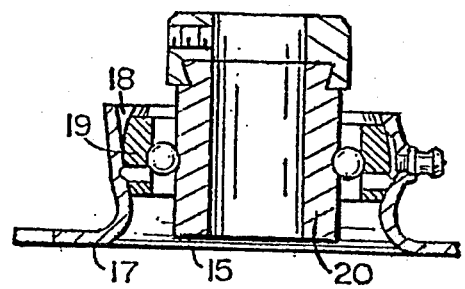
FIG_5
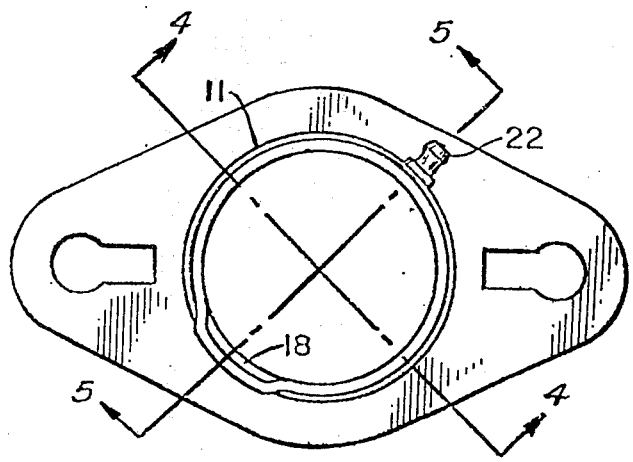
FIG_3
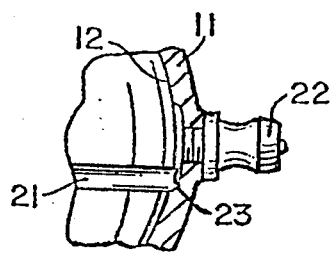
FIG_6

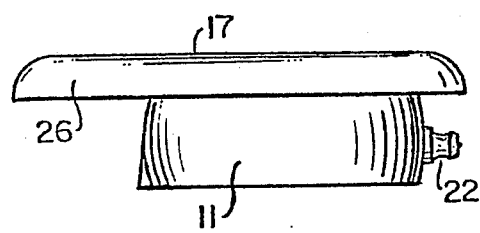
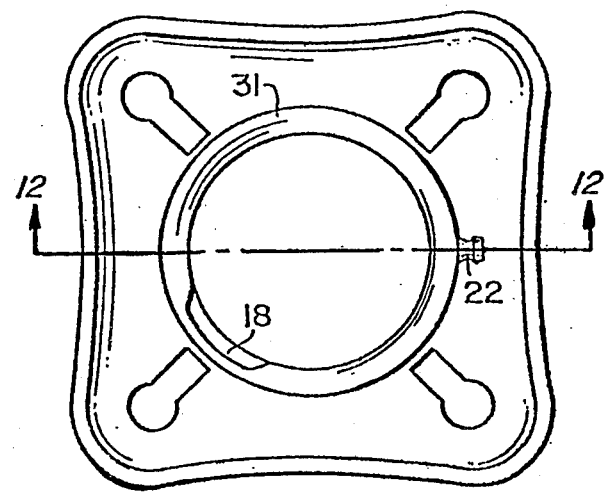
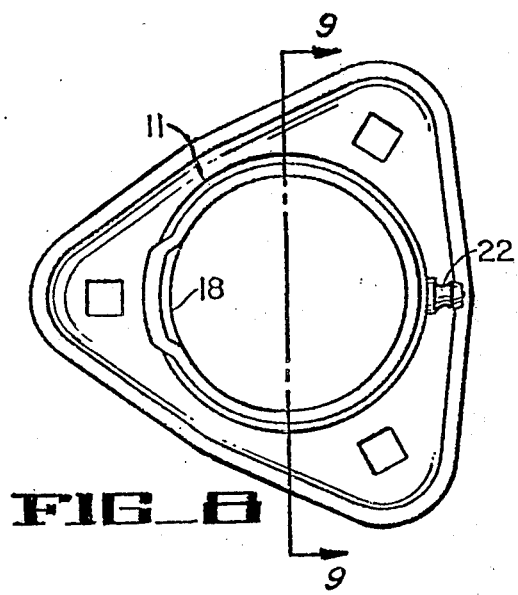
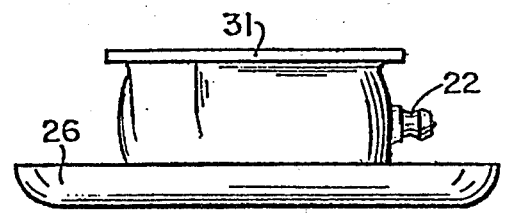
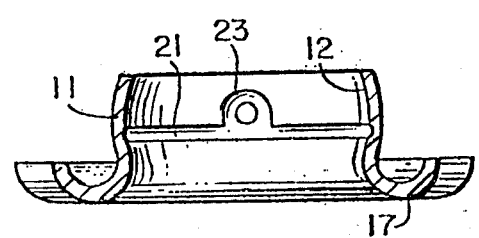
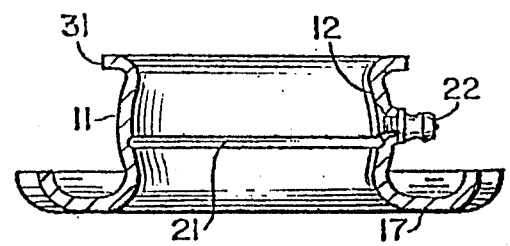

FLANGE MOUNT FOR SPHERICAL BEARING

REFERENCE TO RELATED APPLICATIONS

This application is a continuation of copending application, Ser. No. 743,923, filed Nov. 22, 1976, now abandoned, which is a continuation-in-part of Ser. No. 664,164, filed Mar. 5, 1976, now U.S. Pat. No. 4,033,641.

BACKGROUND OF THE INVENTION

This invention relates generally to a mount for spherical bearings and more particularly to a one-piece strong uniform thickness metal flange mount.

Present designs of flange mounts are generally of two types. One-piece machined cast flanges; and two-piece pressed steel flanges. The flange mounts include two, three and four or more holes for mounting the flange plate to an associated support.

The cast type machined are relatively expensive to process and machine to meet the typical heavy duty service for which they are intended. The surface to which they are attached must be relatively flat for if it is uneven, the units may fracture when secured to the attachment surface.

Pressed metal flange units are relatively economical. However, they are intended for light-duty applications. They generally do not support or accommodate heavy or large radial, thrust and moment loads. Generally, the flange mounts include central portions which project past the mounting face. This requires the user to provide an opening for accommodating the projection. Pressed metal flange units are generally made of two or more mating pieces with attendant adaptations and assembly expenses. Those including lubrication fittings require means for preventing escape of the lubricant. Their most serious drawback is their inclination to bind the bearing they are intended to support because of radial mismatch of the separable mating halves that are clamped together and to a support.

There has been described in U.S. Pat. No. 2,794,691 a one-piece pressed steel flange mount. The mount disclosed in said patent includes a bearing mounting flange having an inner surface with a portion from the center of the flange to one end which is generally of spherical contour and a portion extending from the center to the other end which is generally of cylindrical contour. The cylindrical portion is provided with a bead or the like which extends inwardly to retain an inserted bearing. This forms, together with the spherical portion, an internal surface for retaining the associated bearing. Another embodiment is described in which the mounting flange extends beyond the face of the flange plate. The flange itself is arched and beaded to provide a partially spherical bearing housing. The bearing housing may be provided with slots for mounting the associated bearing. The mount permits some self-alignment of the bearing.

Under heavy duty conditions encountered in farm machinery and industrial uses, the bearing is subjected to impact and heavy axial and radial loads. If the bearing is not intimately held in the housing with good contact throughout its spherical surface, there is a tendency to move under the applied loads. The result is that the contacting portions wear and the mount loosens whereby there is increased movement and finally damage and destruction of the mount. In U.S. Pat. No. 3,966,275, assigned to the same assignee, and which was copending with U.S. Pat. No. 4,033,641 there is described a mount adapted to hold and mount a bearing in a plurality position.

OBJECTS AND SUMMARY OF THE INVENTION

It is a general object of the present invention to provide a strong, economical, one-piece mount for spherical bearings.

It is another object of the present invention to provide a mount for spherical bearings in which the bearing receiving flange includes a spherical surface adapted to intimately contact the outer surface of an inserted spherical bearing.

It is a further object of the present invention to provide a mount for spherical bearing which can be welded to an associated supporting structure.

It is a still further object of the present invention to provide a mount for a spherical bearing which is simple in construction and economical to manufacture.

The foregoing and other objects of the invention are achieved by a flange mount including a flange plate, a bearing receiving flange extending outwardly from one surface thereof and adapted to receive and hold a bearing therein, said bearing receiving flange having an inner surface portion of spherical configuration which is spaced from the flange plate to receive and contact substantially the entire outer surface of an associated bearing for supporting the bearing so that it cannot move axially or radially under load conditions and which permits the bearing to rotate within the mount to align with an associated shaft.

BRIEF DESCRIPTION OF THE DRAWINGS

FIG. 1 is a front plan view of a two-hole mount for spherical bearings in accordance with the present invention.

FIG. 2 is a side elevational view of the mount shown in FIG. 1.

FIG. 3 is a rear plan view of the mount.

FIG. 4 is a sectional view taken generally along the lines 4—4 of FIG. 3.

FIG. 5 is a sectional view taken generally along the line 5—5 of FIG. 3 showing an installed bearing.

FIG. 6 is an enlarged view showing in detail the lubrication fitting and lubrication groove.

FIG. 7 is a side elevational view of a three-hold mount in accordance with another embodiment of the invention.

FIG. 8 is a rear elevational view of the mount of FIG. 7.

FIG. 9 is a sectional view taken along the line 9—9 of FIG. 8.

FIG. 10 is a rear elevational view of a four-hole mount in accordance with still another embodiment of the invention.

FIG. 11 is a side elevational view of the mount of FIG. 10.

FIG. 12 is a sectional view taken generally along the line 12—12 of FIG. 10.

DESCRIPTION OF PREFERRED EMBODIMENT

Referring to the figures, which show spherical bearing mounts in accordance with the invention, it is seen that the mounts are formed from a single sheet metal piece as, for example, by multistage forming in a press with the appropriate dies and mechanisms.

Referring now specifically to FIGS. 1 through 6, there is shown a two-hole bearing mount for spherical bearings.

The mount includes a bearing mounting flange 11 whose inner surface 12 is substantially a surface of revolution to accommodate and hold an associated bearing. Furthermore, the surface 12 is of spherical configuration between the portions 13 and 14 to define a re-entrant bearing mount which, as will be presently described, serves to prevent movement of the associated bearing in the axial direction under axial thrust loads and in the radial direction under radial loads but will permit misalignment under substantial moment loads.

The flange 11 is formed by causing the center of a sheet of metal to extend outwardly from the face 16 opposite the mounting face 17. A bearing is mounted in the spherical surface by inserting the bearing, with its axis perpendicular to the axis of the flange, into the bearing receiving flange through a mounting or insertion groove 18 formed at the rear of the flange. The groove has a width which will accommodate the outer bearing race width 19 race. After insertion, the bearing is rotated so that its axis is substantially coaxial with the flange axis and perpendicular to the mounting face 17. As is well known, the spherical bearing seat provides means whereby the bearing can be aligned with respect to the axis of the shaft.

Preferably, the bearing mounting flange is provided with a circumferential grease receiving groove 21 which communicates with a grease fitting 22. The grease fitting 22 may be retained within the flange by threading or force fitting and communicate with the groove 21 by means of the recess 23 formed adjacent its end. In accordance with the present invention, the spherical seat which extends between the ends 13 and 14 has the end 14 spaced from the front face 17 such that the end 15 of the bearing inner face 20 do not extend beyond the face 17 of the flange. The flange therefore may be flush mounted to an associated supporting surface. It is seen that the thickness of the material at the flange mount surface 17 is substantially equal to the thickness of the flange mount 11 whereby to provide strength.

In those applications where additional strength may be required, the edges of the mounting plate may be bent along the same axis as the mounting flange 11. Referring to FIGS. 7 through 9, the flange plate is shown with bent edges 26. The edges are bent in the same direction as the mounting flange 11 to add strength to the periphery of the flange plate when the mounting bolts are in place. The mounting member shown in FIGS. 7 through 9 is a three-hole mount in contrast to the two-hole mount previously described.

Referring to FIGS. 10 through 12, there is shown a four-hole bearing mount which includes the mounting flange 11 extending outwardly from the face 17. However, in the embodiment shown in these figures, the upper end of the flange includes a rim 31 which adds strength to the end of the flange. In other respects the flange is of the type previously described and like reference numerals have been applied to like parts.

It is apparent that the invention is applicable to two-hole, three-hole, four-hole or multiple hole mounts. The essential features of the invention are the fact that there is provided a substantially spherical mounting surface which engages the outer spherical bearing surface and prevents axial and lateral movement of the bearing to thereby minimize wear and deflection, yet facilitate controlled misalignment of the bearing insert. The plate material forming the mount is of substantially uniform thickness throughout. The mount may be secured to an associated mounting surface by welding.

What is claimed:

1. A flange mount for a spherical bearing having a spherical outer surface including a flange plate and a bearing receiving flange formed from a single sheet metal piece of predetermined thickness and each of which has substantially the same thickness as said sheet metal with said bearing receiving flange extending outwardly from only one face of said flange plate and adapted to receive and hold the bearing therein, said bearing receiving flange having spherical inner and outer surface portions spaced from the one face of the flange plate, said spherical inner surface defining a re-entrant surface adapted to receive and contact substantially the entire outer surface of said spherical bearing to support the bearing so that it cannot move radially or axially in either direction within the bearing receiving flange and yet permits the bearing axis to rotate, the other face of said flange plate defining a mounting surface substantially perpendicular to the axis of said bearing receiving flange for mounting the flange on a supporting surface.

2. A flange mount as in claim 1 including a bearing insertion groove formed in said inner surface for inserting said bearing into the flange.

3. A flange mount as in claim 1 including means for lubricating said bearing formed in said inner surface of the bearing receiving flange.

4. A flange mount as in claim 1 in which the outer edges of said flange plate are bent outwardly from said one face to extend along the same axis as said bearing receiving flange.

5. A flange mount as in claim 1 in which the other end of said bearing receiving flange is bent outwardly to form a rim.

6. A flange mount for a bearing having a spherical outer surface including a flange plate and a bearing receiving flange formed from a single sheet metal piece of predetermined thickness and each of which has substantially the same thickness as said sheet metal with said bearing receiving flange extending outwardly from only one face of said flange plate and adapted to receive and hold the bearing therein, said bearing receiving flange having spherical inner and outer surface portions spaced from the one face of the flange plate, said spherical inner surface defining a re-entrant surface adapted to receive and contact substantially the entire outer surface of said spherical bearing to support the bearing so that it cannot move radially or axially in either direction within the bearing receiving flange and yet permits the bearing axis to rotate, the other face of said flange plate defining a mounting surface substantially perpendicular to the axis of said bearing receiving flange for mounting the flange on a supporting surface, a bearing insertion groove formed in said inner surface for inserting said bearing into the flange, and means for lubricating said bearing formed in said inner surface of the bearing receiving flange.

* * * * *